(12) United States Patent
Baker

(10) Patent No.: US 8,074,926 B2
(45) Date of Patent: Dec. 13, 2011

(54) STRUCTURAL DYNAMIC STABILITY FOR AN AIRCRAFT

(75) Inventor: John Baker, San Antonio, TX (US)

(73) Assignee: Calvin Burgess, Guthrie, OK (US)

( * ) Notice: Subject to any disclaimer, the term of this patent is extended or adjusted under 35 U.S.C. 154(b) by 779 days.

(21) Appl. No.: 11/644,853

(22) Filed: Dec. 22, 2006

(65) Prior Publication Data

US 2008/0149762 A1 Jun. 26, 2008

(51) Int. Cl.
*B64C 17/00* (2006.01)

(52) U.S. Cl. .............. 244/93; 244/87; 244/89; 244/90 R

(58) Field of Classification Search .................. 244/1 R, 244/34 R, 87, 89, 90 R, 93, 215, 123.1, 131, 244/117 R, 119, 129.1, 133; 29/426.1, 426.2
See application file for complete search history.

(56) References Cited

U.S. PATENT DOCUMENTS

| | | | | |
|---|---|---|---|---|
| 1,992,157 A | * | 2/1935 | Hall | 244/216 |
| 2,859,925 A | * | 11/1958 | Jacques | 244/99.13 |
| 2,930,550 A | * | 3/1960 | Strang | 244/82 |
| 3,119,469 A | * | 1/1964 | Farr et al. | 188/276 |
| 3,229,934 A | * | 1/1966 | Vogtle | 244/80 |
| 4,428,550 A | * | 1/1984 | Evans et al. | 244/93 |
| 5,159,865 A | * | 11/1992 | Hinckley | 83/16 |
| 2002/0166219 A1 | * | 11/2002 | David et al. | 29/402.03 |

* cited by examiner

*Primary Examiner* — Tien Dinh
*Assistant Examiner* — Philip J Bonzell
(74) *Attorney, Agent, or Firm* — Daniel P. Dooley; Fellers, Snider, et al.

(57) ABSTRACT

An improvement and method for improved structural dynamic stability for 20 and 30 Series Learjets are disclosed. The improvement includes a redistribution of the elevator mass balance to uncouple the elevator rotational motion from the stabilizer translation motion for the higher order horizontal frequencies having node lines in the proximity of the mass outboard counterbalance weights. The original tail section includes a rudder, and a horizontal stabilizer supporting an elevator mounted adjacent the rudder. The elevator includes a proximal end adjacent the rudder and a distal end that includes a counterbalance portion. The improvement includes replacement of an original mass counterbalance weight from within the counterbalance portion with a new mass counterbalance weight of less mass, and the inclusion of additional mass counterbalance weights disposed within the elevator and interposed between the proximal end and the counterbalance portion.

6 Claims, 5 Drawing Sheets

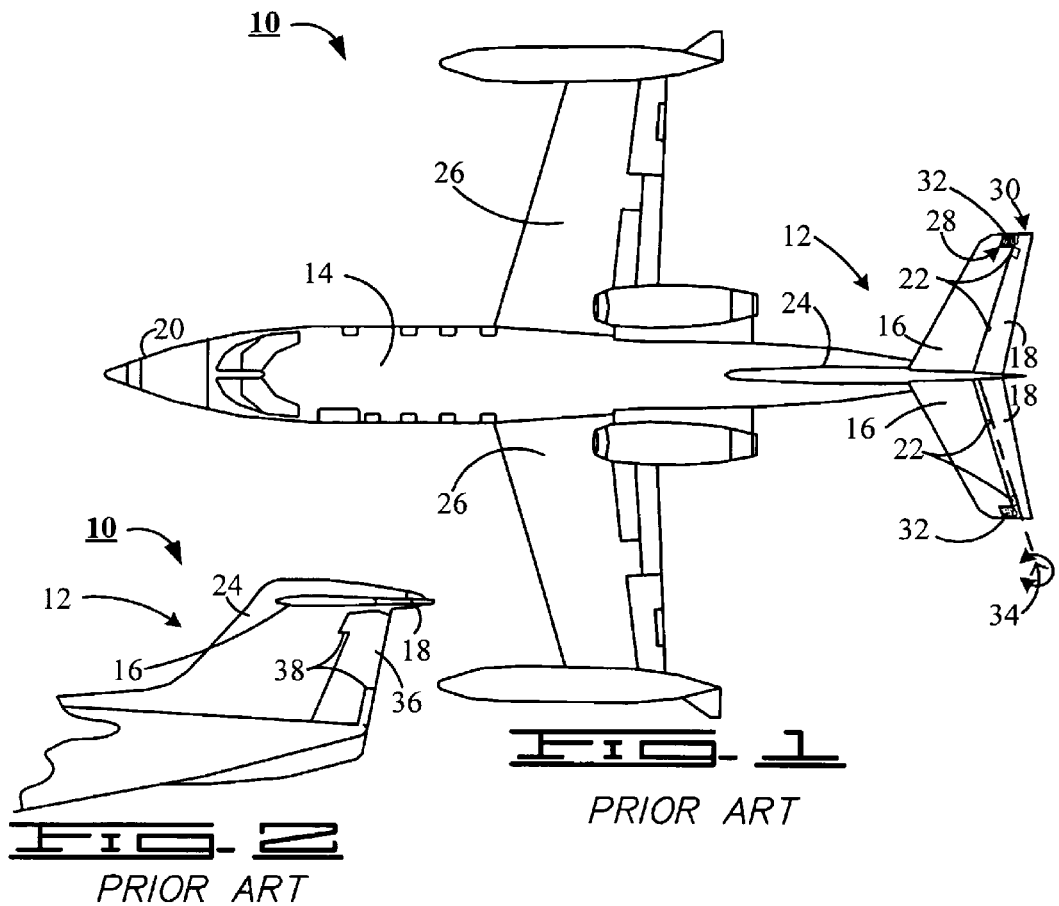
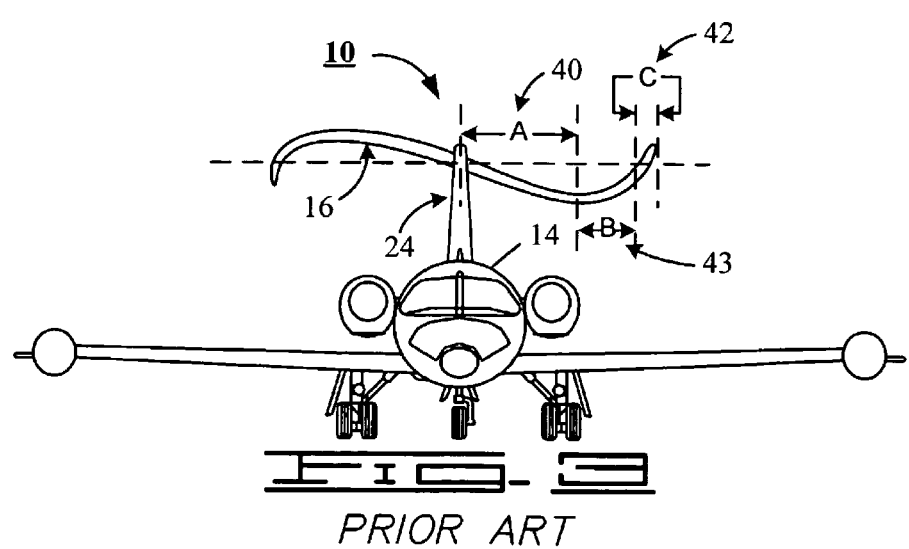

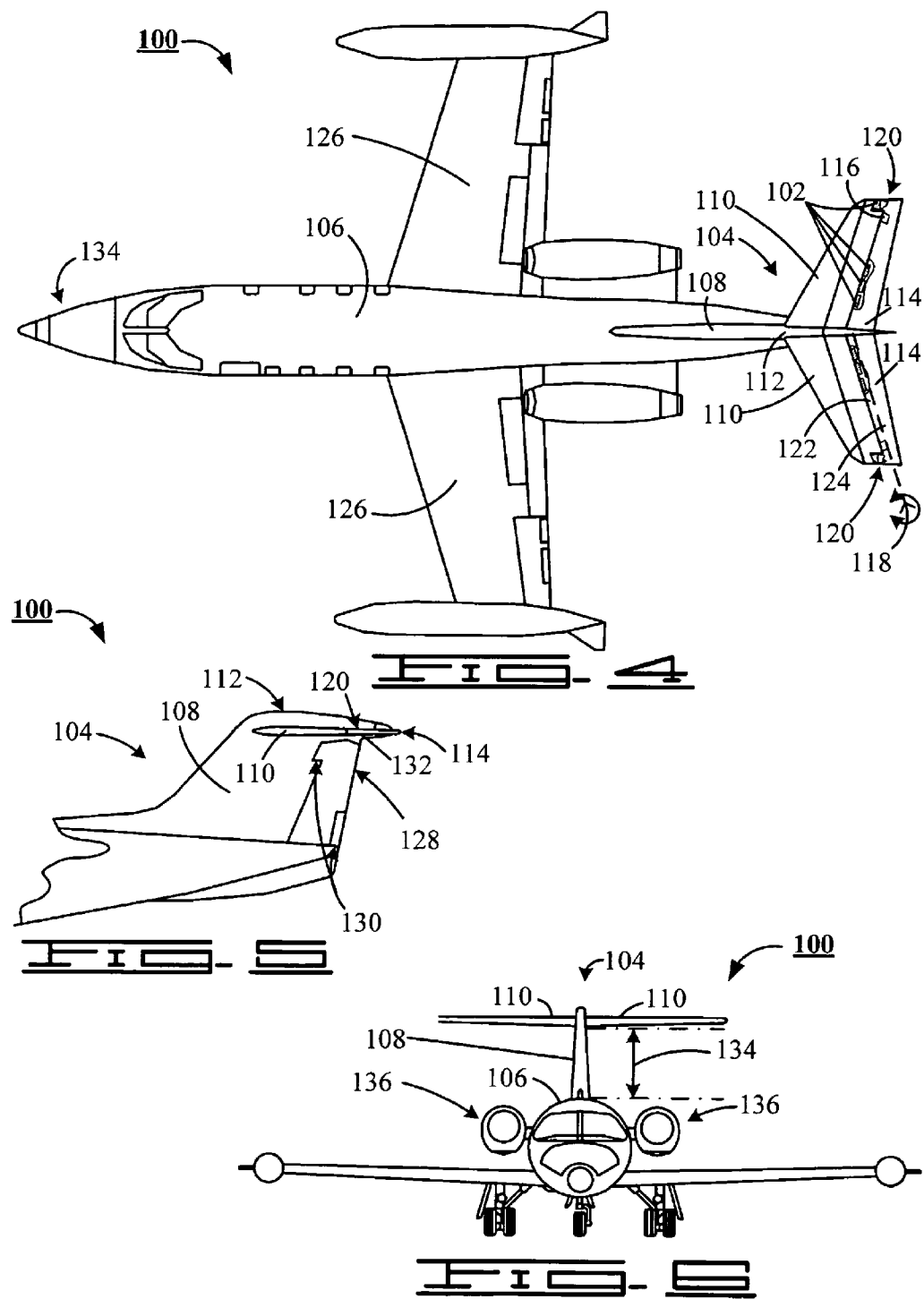

STRUCTURAL DYNAMIC STABILITY FOR AN AIRCRAFT

FIELD THE INVENTION

The claimed invention relates generally to the field of aeronautics and more particularly, but not by way of limitation, to a method and apparatus for improved structural dynamic stability for an aircraft.

BACKGROUND

The determination of a "flight envelope" for an aircraft is an important task typically undertaken by aeronautical engineers during the development and testing phases of aircraft design. Flight testing is performed to evaluate the characteristics of an aircraft and to determine a range of flight conditions in which an aircraft can be operated with safety. A particularly dangerous type of instability, and which is typically tested for, is flutter. Flutter results from a coupling between structural and aerodynamic forces. Flutter is an aerodynamically induced vibration, involving the coupling of two primary modes of vibration or a primary mode with a control rotation mode of vibration such that the aerodynamic forces overcome the structural damping forces to produce divergent oscillations.

In 1964, following the development, testing, and certification phases of the 20 Series Learjet, the aircraft was introduced into the market as the first true business class, jet propelled aircraft. In 1974, Lear followed the 20 Series Learjet with the introduction of the 30 Series Learjet, which included a number of refinements and enhancements to the 20 Series Learjet. However, one area of the aircraft's design that did not undergo modifications or refinements was the tail section.

Engineering analysis and modeling of aircraft which have structural dynamics very similar to Learjet's Series 20 and 30 aircraft have provided a predictive basis for a susceptibility of Learjet's Series 20 and 30 aircraft to tail flutter, during certain flight conditions within the certified flight envelope. When present, flutter manifests itself as a resonance that causes the horizontal stabilizer portion of the tail section to oscillate at around a 28 Hz frequency. Accordingly, there is a need for the preemptive reduction in the susceptibility of the horizontal stabilizer to flutter within the Series 20 and Series 30.

SUMMARY OF THE INVENTION

In accordance with a preferred embodiment, an improvement in structural dynamic stability for an aircraft selected from a group that preferably consists of a 20 Series and 30 Series Learjet is provided. The improvement preferably includes at least a tail section providing a horizontal stabilizer supporting an elevator with a portion of a mass counterbalance weight distributed along a leading edge of said elevator, wherein a weight and distribution of the portion of the mass counterbalance weight is selected to facilitate an uncoupling of a rotational motion of said elevator from translation motions of said stabilizer, thereby mitigating an occurrence of a flutter event.

The original tail section includes at least a rudder, and a horizontal stabilizer supporting an elevator mounted adjacent said rudder. The elevator includes at least a proximal end adjacent said rudder and a distal end providing a counterbalance portion, which houses an original mass counterbalance weight. The improvement includes at least replacement of the original mass counterbalance weight with a first new mass counterbalance weight, wherein the first new mass counterbalance weight has a weight less than a weight of the original mass counterbalance weight, and the inclusion of additional mass counterbalance weights disposed within the elevator and interposed between the proximal end and the counterbalance portion of the elevator. In a preferred embodiment, the total weight of the first new counterbalance weight and the additional mass counterbalance weight is greater than the total weight of the original mass counterbalance weight.

In accordance with an alternate preferred embodiment, a method of improving structural dynamic stability of an aircraft selected from a group consisting of a 20 Series Learjet and a 30 Series Learjet is provided by steps that preferably include: removing an original elevator from a horizontal stabilizer of the aircraft; removing an original leading edge skin portion from the original elevator; and removing an original mass counterbalance weight from a counterbalance portion of the original elevator.

The alternate preferred embodiment preferably further includes the steps of mounting a first new mass counterbalance weight within the counterbalance portion, wherein the new mass counterbalance weight provides less weight than the original mass counterbalance weight; and mounting a second mass counterbalance weight within a second portion of the elevator, wherein the second portion of the elevator and interposed between a proximal end of the elevator and the counterbalance portion of the elevator.

These and various other features and advantages, which characterize preferred embodiments of the present invention, will be apparent from reading the following detailed description in conjunction with reviewing the associated drawings.

BRIEF DESCRIPTION OF THE DRAWINGS

FIG. 1 is a top plan, partial cut-away view of prior art aircraft applicable to the present invention.

FIG. 2 shows a partial cut-away, side elevational view of a tail section of the prior art aircraft of FIG. 1.

FIG. 3 provides a front elevational view of the prior art aircraft of FIG. 1.

FIG. 4 is a top plan, partial cut-away view of an aircraft of the present invention.

FIG. 5 shows a partial cut-away, side elevational view of a tail section of the aircraft of FIG. 4.

FIG. 6 provides a front elevational view of the aircraft of FIG. 4.

DETAILED DESCRIPTION

Figure 7:
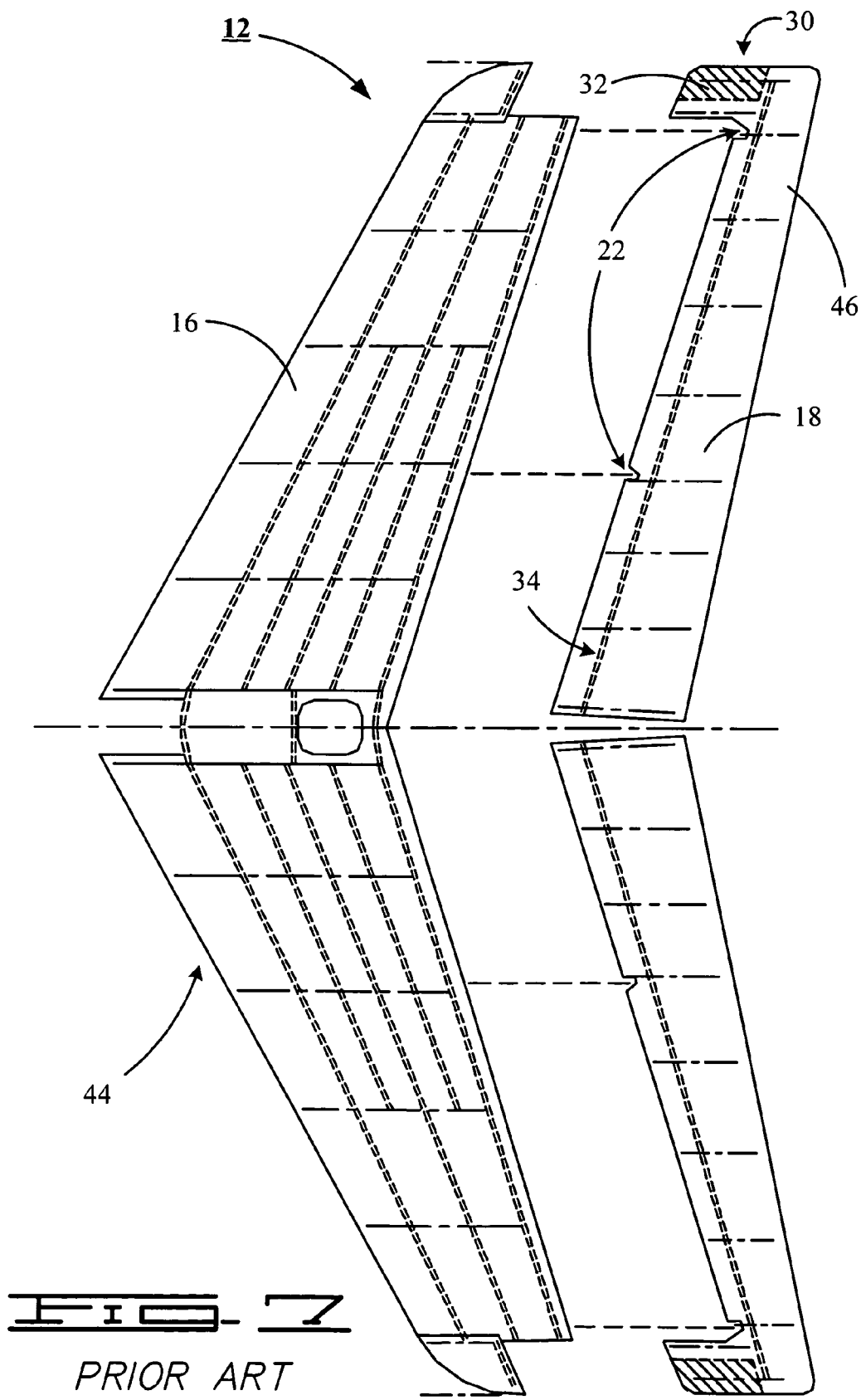
FIG. 7 shows a top plan, partial cut-away, exploded view of a stabilizer and elevator of the prior art aircraft of FIG. 1.

Reference will now be made in detail to one or more examples of the invention depicted in the accompanying figures. Each example is provided by way of explanation of the invention, and not meant as, nor do they represent, limitations imposed upon the invention. For example, features illustrated or described as part of one embodiment may be used with another embodiment to yield still a different embodiment. Other modifications and variations to the described embodiments are also contemplated and lie within the scope and spirit of the invention.

Preferably, the improvement disclosed herein includes a redistribution of the elevator balance weights so as to provide dynamic balance between the rotation of the elevator and the translation motion of the higher order modes, such as the 28 CPS mode, as well as the translation motion of the lower fundamental modes of vibration.

The original elevator design configuration for 20 and 30 Series Learjets concentrated the elevator balance weight at the outboard elevator horn which is very effective for stabilizing the low frequency fundamental modes but can cause the higher order modes to become unstable. The instability of the higher order modes is associated with the single balance weight being located on the wrong side of the node line such that the balance weight has a higher propensity of producing an unstable flutter coupling.

In a preferred embodiment, the redistribution of the balance weight removes weight from the elevator tip which helps to stabilize the higher frequency modes and adds balance weights to the inboard portion of the elevator, which dynamically uncouples the inboard portion of the elevator, and enhances the stability of the higher frequency modes. Both the inboard and outboard balance weights will stabilize the fundamental lower frequency vibration modes, with the outboard balance being more effective.

Referring to the drawings, to provide an enhanced understanding of the present invention, a reader is encouraged to view prior art FIGS. 1, 2, and 3 in concert while proceeding with reading this description of the present invention. Collectively, prior art FIGS. 1, 2, and 3 depict prior art 20 and 30 Series Learjet aircraft applicable for use with the present invention.

Prior art FIG. 1 is useful for presenting a plan view of both a prior art 20 Series Learjet aircraft and a prior art 30 Series Learjet (collectively prior art aircraft 10). Prior art FIG. 2 shows a tail section 12 in partial cut-away view, and prior art FIG. 3 shows the front elevational view suitable for depicting either the 20 or 30 Series prior art Learjet aircraft. When collectively viewing prior art FIGS. 1, 2, and 3, the reader's attention is drawn to the tail section 12, relative to other sections and references of the prior art aircraft 10.

Prior art FIG. 1 shows that at a rear of a fuselage 14 the prior art aircraft 10 includes a horizontal stabilizer 16 and an elevator 18. The horizontal stabilizer 16 is preferably a fixed wing tasked with the job of providing stability for the aircraft. The horizontal stabilizer 16 prevents up-and-down, or pitching, motion of the aircraft nose 20 during in flight excursions. The elevator 18 is the small moving section at the rear of the horizontal stabilizer 16; the elevator 18 is attached to the horizontal stabilizer 16 by hinges 22. Because the elevator 18 moves, it varies the amount of force generated by the surface of the horizontal stabilizer 16 and elevator 18, and is used to generate and control the pitching motion of the aircraft, including the prior art aircraft 10 and the present inventive aircraft 100 (of FIG. 4).

Each horizontal stabilizer 16, with its accompanying elevator 18, is attached to each side of a vertical stabilizer 24. The vertical stabilizer 24 is tasked with keeping the nose 20 of an aircraft, including the prior art aircraft 10 and the present inventive aircraft 100, from swinging from side to side. The elevators 18 work in pairs; when the right elevator 18 goes up, the left elevator 18 also goes up. The elevator 18 is used to control the position of the nose 20 of an aircraft, and the angle of attack of a wing 26. Changing the inclination of the wing 26 to the local flight path changes the amount of lift which the wing 26 generates. This, in turn, causes an aircraft, including the prior art aircraft 10 and the present inventive aircraft 100, to climb or dive. During take off, the elevators 18 are used to bring the nose 20 of the prior art aircraft 10 up to begin the climb out. During a banked turn, elevator 18 inputs can increase the lift and cause a tighter turn.

FIG. 1 further shows that the elevator 18 includes a counterbalance portion 28 located on a distal end 30 of the elevator 18. The counterbalance portion 28 is sized to accommodate an original mass counterbalance weight 32, shown in partial cut-away. The hinges 22 provide an axis of rotation 34 for the elevator 18. The original mass counterbalance weight 32 is positioned within the counterbalance portion 28 on a first side of the axis of rotation 34, and provides a weight sized to substantially offset the mass of the remaining portion of the elevator 18 located on a second side of the axis of rotation 34. In a preferred embodiment of the prior art aircraft 10, the mass counterbalance weight 32 maintains the elevator 18 in a neutral position with respect to the horizontal stabilizer 16 in the absence of a force being applied to the elevator 18 to change the aerodynamic profile of the horizontal stabilizer 16 and the elevator 18 during in flight maneuvers.

The prior art aircraft 10, of FIG. 2 depicts a rudder 36, which is a small moving section located at the rear of the vertical stabilizer 24, and is attached to the vertical stabilizer 24 by hinges 38. Because the rudder 36 moves, it varies the amount of force generated by the vertical stabilizer 24, which is used to generate and control the yawing motion of the prior art aircraft 10. The rudder 36 is used to control the lateral position or yaw position of the nose 20 of the prior art aircraft 10. The rudder 36 input insures that the prior art aircraft 10 is properly aligned to the curved flight path during in flight maneuvers. Otherwise, the prior art aircraft 10 would encounter additional drag or even a possible adverse yaw condition in which, due to increased drag from the control surfaces, the nose 20 would move farther off the flight path.

With the mass counterbalance weight 32 positioned within the elevators 18 as shown by FIG. 1, the 20 and 30 Series prior art Learjet aircraft 10 of FIG. 3 is susceptible to a flutter condition shown by FIG. 3, at a frequency of about 28 CPS. Flutter is the dynamic response of a vibrating system under aerodynamic load when excited by an external oscillating force. Once the load reduces, the deflection also reduces, restoring the original shape, which restores the original load and starts the cycle again. At its mildest flutter can appear as a "buzz" in the aircraft structure, but at its most violent it can develop uncontrollably with great speed and cause serious damage to or the destruction of the aircraft.

FIG. 3 shows the horizontal stabilizer during a flutter condition at a frequency of about 28 CPS. The position of the horizontal stabilizer 16 changes its shape, relative to the vertical stabilizer 24 and its aerodynamic attributes. During the flutter condition, area "A" 40 drives the flutter instability, and with the mass counterbalance weight 32 positioned within the tip of the elevator 18 (of FIG. 1) i.e., area "C" 42, the mass counterbalance weight 32 destabilizes with the flutter mechanism. Preferably, by re-distributing the mass counterbalance weight 32 along the leading edge of the elevator 18, within area "B" 43, as shown by the positioning of the mass counterbalance weight 102 within elevator 114 (of FIG. 4), the destabilization effect of area C 43 is canceled out.

It is noted that, under principles of structural dynamics, the rotation of the elevator 18 coupling with the translational motion of the stabilizer 16 predicatively induce flutter instability. During a flutter event, the elevator 18 rotation will lag behind the translational motion of the stabilizer 16 by 90 degrees. This phase lag allows the elevator 18 to aerodynamically feed the vibrational motion of the stabilizer 16.

For ease in contrasting the present invention with the prior art, FIGS. 4, 5, and 6 are provided to depict the present invention in views comparable to FIGS. 1, 2, and 3. Accordingly, viewing FIGS. 4, 5, and 6 together will provide an enhanced understanding of the present invention. Collectively, FIGS. 4, 5, and 6 depict structural changes made to the 20 and 30 Series Learjet aircraft to produce an improved present inventive aircraft 100. FIG. 4 presents a plan view of an inventive aircraft 100 and is useful for showing a change in the location and distribution of the mass counterbalance weight 32 of prior art aircraft 10 (of FIG. 1) and a new mass counterbalance weight 102 of the inventive aircraft 100. FIG. 5 shows the inventive aircraft 100 in a side elevational view, which is useful in helping with understanding a structural relationship between portions of a tail section 104 of the inventive aircraft 100.

FIG. 6 shows the front elevational view of inventive aircraft 100 suitable for depicting a contrast in flutter performance of the prior art aircraft 10 (of FIG. 1) and the inventive aircraft 100. When collectively viewing FIGS. 4, 5, and 6, the reader's attention is drawn to the location and distribution of the new mass counterbalance weight 102 relative to other sections and references of the inventive aircraft 100.

In a preferred embodiment shown by FIG. 4, the tail section 104 is mounted in the aft portion of a fuselage 106 of the inventive aircraft 100. Preferably the tail section 104 includes a vertical stabilizer 108, which extends vertically from the fuselage 106 and supports a horizontal stabilizer 110 at a portion 112 distal from the intersection of the vertical stabilizer 108 and the fuselage 106. The horizontal stabilizer 110 preferably supports an elevator 114 via a hinge 116.

The hinges 116 preferably provide an axis of rotation 118 for the elevator 114. The new mass counterbalance weight 102 is partially positioned within a counterbalance portion 120 of the elevator 114, and partially distributed along a first side (or leading edge) 122 of the axis of rotation 118. The total weight of the new mass counterbalance weight 102 is preferably sized to substantially offset the mass of the remaining portion of the elevator 114 located on a second side 124 of the axis of rotation 118.

In a preferred embodiment, a result of the distribution of the new mass counterbalance weight 102 partially within the counterbalance portion 120 and partially along the first side 122 at a position close to the axis of rotation 118, is that the collective weight of the new mass counterbalance weight 102 is increased to about double that of the original mass counterbalance weight 32 (of FIG. 1).

A result of about doubling the weight of the new mass counterbalance weight 102 is a member formed from the horizontal stabilizer 110 and elevator 114, which has a combined mass greater than a combined mass of a member formed from the horizontal stabilizer 16 and elevator 18 of the prior art aircraft 10 (of FIG. 1). While the changing of the mass counterbalance weights does have some influence on the stabilizer natural frequencies, the primary influence of the distribution of the mass counterbalance weight 102 along the leading edge (particularly within area B of FIG. 3) is to uncouple the elevator 114 rotation motion from the stabilizer 110 translation motion, thereby negating the predictive occurrence of a flutter event.

FIG. 5 shows the tail section 104 of the inventive aircraft 100 includes a rudder 128 secured to the vertical stabilizer 108 by a hinge 130. As with the prior art aircraft 10 (of FIG. 2), the elevator 114 includes a proximal end 132 adjacent the rudder 128, and a distal end that provides the mass counterbalance weight portion 120. The rudder 128 is used to control the lateral position or yaw position of a nose 134 (of FIG. 1) of the aircraft 100.

FIG. 7 provides a more detailed view of the interrelationships between select components of interest of the tail section 12 of the prior art aircraft 10 (of FIG. 1). The tail section 12 components chosen for inclusion in FIG. 7 are: the horizontal stabilizer 16; the elevator 18 secured to the horizontal stabilizer 16 by the hinge 22, which promotes pivoting of the elevator 18 about the rotational axis 34, and the mass counterbalance portion 30 of the elevator 18, which is used to confine the mass counterbalance weight 32 on a first side of the rotational axis 34.

Figure 8:
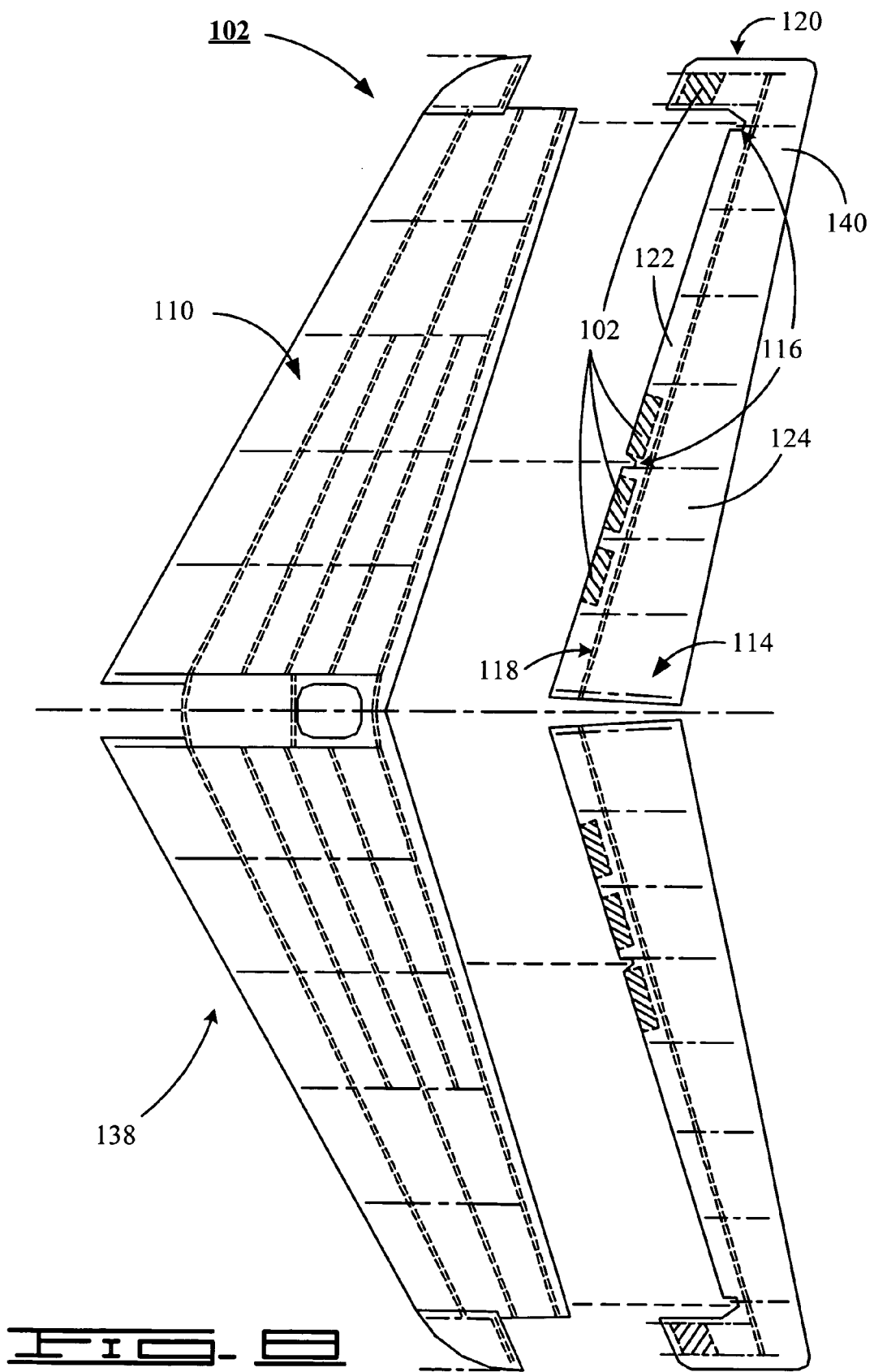
FIG. 8 provides a top plan, partial cut-away, exploded view of a stabilizer and elevator of the aircraft of FIG. 4.

FIG. 8 shows a more detailed view of the interrelationships between select components of interest of the tail section 102 of the present inventive aircraft 100 (of FIG. 4), and is provided for purposes of contrast with FIG. 7 to enhance an understanding of the present inventive aircraft 100. In a preferred embodiment, the location, weight, and distribution of the mass counterbalance weight 102 along the leading edge of the elevator 114 is selected to uncouple the elevator 114 rotation motion from the stabilizer 110 translation motions, thereby mitigating the predictive occurrence of a flutter event at a frequency of about 28 CPS. The member 138 is formed from the horizontal stabilizer 110; the elevator 114 secured to the horizontal stabilizer 110 by the hinge 116; and the mass counterbalance weight 102 covered by a skin 140 of the elevator 114. The member 44 (of FIG. 7) is formed from the horizontal stabilizer 16; the elevator 18 secured to the horizontal stabilizer 16 by the hinge 22; and the mass counterbalance weight 32 covered by a skin 46 of the elevator 18 (each of FIG. 7). Accordingly, FIG. 8 shows the elevator 114 with the new mass counterbalance weight 102 removed from the horizontal stabilizer 110 of the inventive aircraft 100, i.e., removed from the inventive aircraft 100, while FIG. 4 shows the elevator 114 with the new mass counterbalance weight 102 mounted to the horizontal stabilizer 110 of the inventive aircraft 100, i.e., mounted to the inventive aircraft 100.

Figure 9:
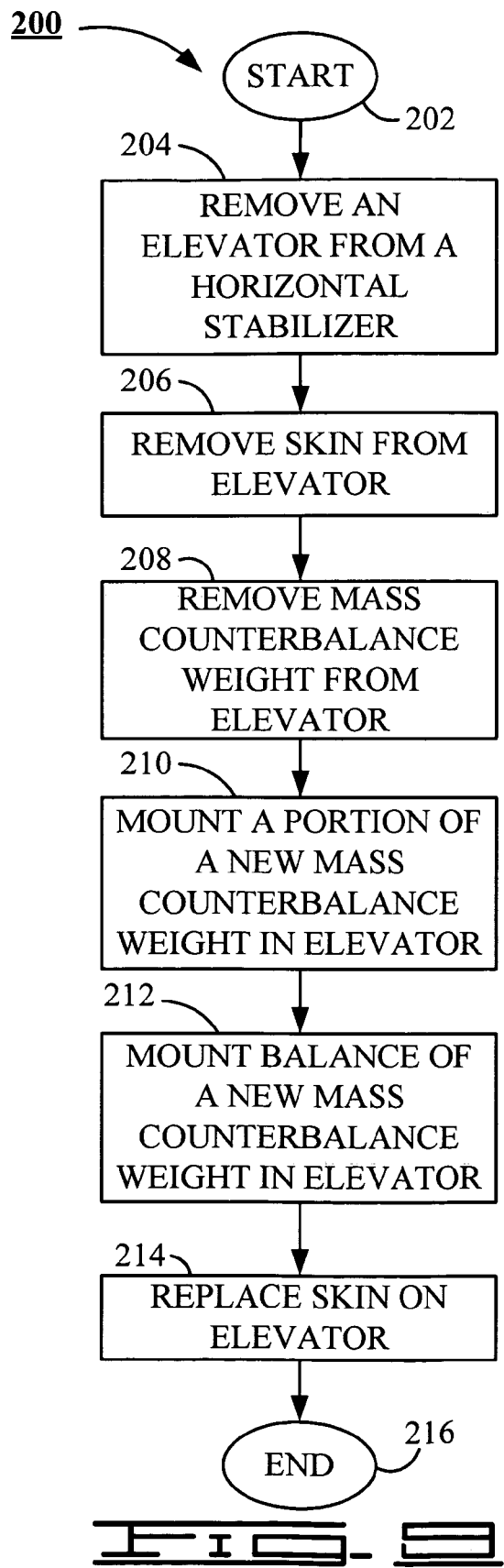
FIG. 9 is a diagram of a flowchart of a method of making the present invention.

Turning to FIG. 9, shown therein is a flow chart 200 which depicts a process of forming an inventive aircraft (such as 100). The method commences at start process step 202 and proceeds to process step 204 with the removal of an elevator (such as 18) from a horizontal stabilizer (such as 16). At process step 206, at least a portion of a skin (such as 46) is removed from the elevator (preferably only a leading edge portion of the skin is removed). Following the removal of the skin portion from the elevator, a mass counterbalance weight (such as 32) is removed from the elevator at process step 208.

At process step 210, a portion for a new mass counterbalance weight (such as 102) is positioned within a mass counterbalance portion (such as 120) of an elevator (such as 114), wherein the elevator 114 is preferably derived from the elevator 18. At process step 212, the remaining portions of the new mass counterbalance weight is distributed within the elevator. At process step 214, at least a portion of a skin (such as 140) is replaced onto the elevator 114, and the process concludes at end process step 216 (preferably, if only a leading edge portion of the skin was removed, the leading edge portion is replaced).

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements (such as particular weight and distribution of the mass counterbalance weight) may vary depending on the particular application for a select engine. However, neither the introduction of a selected engine nor a selected weight and distribution of the mass counterbalance weight, will alter the functionality of the present invention, or departing from the spirit and scope of the invention expressed by the appended claims.

What is claimed is:

1. A method of improving structural dynamic stability of an aircraft by steps comprising:
    removing an original elevator from a horizontal stabilizer of said aircraft, in which said horizontal stabilizer is secured to a rudder of said aircraft;
    removing an original skin portion from said original elevator;
    removing an original mass counterbalance weight from a counterbalance portion of said original elevator; and
    mounting said original elevator having a skin enclosing a new mass counterbalance weight to said horizontal stabilizer of said aircraft to negate a predictive occurrence of a flutter event of said aircraft stemming from said original elevator including said original mass counterbalance weight secured to said aircraft, wherein said elevator includes at least a proximal end adjacent said rudder, and further wherein the new mass counterbalance weight includes at least a plurality of non-contacting mass counterbalance weights disposed between the rudder and the counterbalance portion.

2. The method of claim 1, by a step further comprising, mounting a first portion of said new mass counterbalance weight within said counterbalance portion, wherein said first portion of said new mass counterbalance weight provides less mass than said original mass counterbalance weight.

3. The method of claim 1, in which said aircraft comprising the horizontal stabilizer, said elevator comprising an upstream edge and a downstream edge, wherein said elevator is attached to said horizontal stabilizer at a hinge point thereby providing an axis of rotation for said elevator relative to said horizontal stabilizer, and wherein said elevator further comprising, a first portion disposed between said axis of rotation and said downstream edge, and a second portion disposed between said axis of rotation and said upstream portion, wherein the improvement further comprising steps of:
    mounting a first portion of said new mass counterbalance weight within said counterbalance portion of said original elevator, wherein said first portion of said new mass counterbalance weight provides less mass than a mass provided by said original mass counterbalance weight; and
    mounting said plurality of non-contacting new mass counter balancing weights within said second portion of said elevator and interposed between said proximal end and said counterbalance portion of said elevator.

4. The method of claim 3, by a step further comprising, mounting a new skin portion onto said elevator to replace said removed original skin portion.

5. The method of claim 4, wherein said original skin portion comprising an entire skin of said elevator, and in which said new skin portion comprising an entire replacement skin for said elevator.

6. The method of claim 4, wherein said original skin portion comprising a predetermined section of an entire skin of said elevator, and in which said new skin portion comprising a section of skin of predetermined size and configuration prepared for use as a replacement for said removed original skin portion.

* * * * *